United States Patent [19]

Lehtovaara

[11] Patent Number: 5,209,353
[45] Date of Patent: May 11, 1993

[54] DISKETTE FILLING SYSTEM

[76] Inventor: Jorge J. Lehtovaara, 256 Dixon Road, Apt. 1203, Weston, Ontario, Canada, M9R 1R7

[21] Appl. No.: 426,196

[22] Filed: Oct. 25, 1989

[30] Foreign Application Priority Data

Oct. 25, 1988 [CA] Canada .................. 581123

[51] Int. Cl.⁵ .......................................... B65D 73/00
[52] U.S. Cl. ................ 206/459.5; 206/312; 206/444; 40/641
[58] Field of Search ............... 206/309, 312, 444, 459, 206/425, 459.5; 40/3.2, 641

[56] References Cited

U.S. PATENT DOCUMENTS

| | | | |
|---|---|---|---|
| 1,060,559 | 4/1913 | Rockwell | 206/312 |
| 2,480,416 | 8/1949 | Modes | 206/312 |
| 3,245,162 | 4/1966 | McElroy | 40/641 |
| 3,301,467 | 1/1967 | Shore | 206/312 |
| 3,306,437 | 2/1967 | Nelson | 206/459 |
| 3,717,297 | 2/1973 | Perry | 206/312 |
| 3,987,900 | 10/1976 | Tadokoro et al. | 206/444 |
| 4,240,840 | 12/1980 | Barber | 40/641 |
| 4,325,507 | 4/1982 | Janhonen | 206/309 |
| 4,473,153 | 9/1984 | Colangelo | 206/444 |
| 4,479,579 | 10/1984 | Miklos | 206/309 |
| 4,508,366 | 4/1985 | Brindle | 206/309 |
| 4,519,500 | 5/1985 | Perchak | 206/444 |
| 4,637,149 | 1/1987 | Rivkin | 40/641 |
| 4,667,819 | 5/1987 | Lu | 206/444 |
| 4,757,901 | 7/1988 | Woods | 206/459 |
| 4,776,463 | 10/1988 | Press | 206/309 |
| 4,778,047 | 10/1988 | Lay | 206/309 |
| 4,852,740 | 8/1989 | Sellar et al. | 206/309 |
| 4,905,217 | 2/1990 | King et al. | 206/444 |

FOREIGN PATENT DOCUMENTS 350525  3/1922  Fed. Rep. of Germany ...... 206/309

OTHER PUBLICATIONS

IBM Technical Disclosure Bulletin, vol. 29 Jun. 1986 "Diskette Jacket".

Primary Examiner—David T. Fidei
Attorney, Agent, or Firm—Eugene J. A. Gierczak

[57] ABSTRACT

A filing system for computer diskettes comprising an identification label and a filing enclosure, the label including a pressure sensitive adhesive to permit attachment to a diskette and the filing enclosure made of sheet material comprising a front panel and back panel, each having a top portion, bottom portion and side portion, the bottom portion of the front and back panel connected by a traverse fold line to form a closed bottom, the top portion of the front and back panel secured together to form a closed top and at least one of the side portions of the front and back panel each including a cut out forming an open end with an opposite side portion of the front and back panels secured together to form a closed side, whereby a filing enclosure is formed having a dimension between the closed top and bottom greater than a first dimension of the diskette with the distance between the closed side and open end less than a second dimension of the diskette such that the diskette projects outwardly beyond the periphery of the filing enclosure to permit viewing of the label, the filing enclosure and the label including indica that are visual similar to readily indicate matching placement of a diskette to a filing enclosure.

19 Claims, 5 Drawing Sheets

DISKETTE FILLING SYSTEM

BACKGROUND OF THE INVENTION

The present invention relates to a method and means therefor for filing and storing computer diskettes in such a way that diskettes containing particular data can be easily recognized and found.

The common practice for filing and storing computer diskettes is to insert the diskettes inside the sleeves normally supplied with the diskettes and then keep the diskette/sleeve combinations standing vertically in file boxes. The diskettes are normally supplied together with labels equipped with pressure sensitive adhesive. These labels are to be placed on the face of the diskette by the user and filled with the information regarding the data stored on the particular diskette. This method has some drawbacks, for example the diskette manufactures normally warn about writing anything on the label once it is placed on the diskette especially with any sharp-pointed writing instrument because this may damage the diskette. The space available on these small labels is also very limited and in most applications it is not possible to even have a full listing of the contents of the diskette, not to mention the possibility to write further descriptive notes about the contents and/or instructions on how to use the data stored in them. It is also impossible to write on these labels while the diskette is inside a diskette drive, precisely at the time when there is the need to record certain events which are taking place within the data and/or programs inside the computer.

Another way of showing the contents of a diskette, is to produce a listing of the data either by hand or with the help of computer software programs and to store this listing next to the diskette. Commercially available applications for this method normally use specially made storage pockets which can accommodate both the diskette and its listing next to each other. These storage pockets are normally quite large in size and, therefore, are kept in hanging suspension files or in a book form. Disadvantages of these systems are that the information regarding a diskette does not follow the diskette when it is removed from its large, often totally stationary file. Secondly, if computer programs are used to create the information, the system is limited to the format and content that this particular program is able to handle and produce.

The objective of the invention is to provide a method and means to file computer diskettes in such a way that while the need to write on the diskette label is minimized it becomes simultaneously easier for the user to indicate and see in detail what kind of data is stored on the diskette, to show the instructions of how to use it, to make this information portable with the diskettes and to make it easier to file the diskettes in such a way that diskettes with a particular type of data are readily recognizable whether inside or outside the filing boxes.

The present invention consists of a method of associating and identifying the computer diskette with a particular filing pocket, by means of a small selfadhesive label which is to be attached to the diskette by the user and to be marked with a same code which is being written on the filing pocket by the user, the said filing pocket being constructed in such a way that it allows all or most of the relevant information regarding this particular diskette to be written by the user on at least one face of the pocket.

In the basic form of the invention a label with pressure sensitive adhesive is placed on the diskette and an identification code is written on the label as well as on a filing enclosure, which is constructed so that a considerable surface area of this enclosure is available for the user to write any information, which is found to be relevant regarding the particular diskette stored within this enclosure. It should be noted that the invention does not only provide a substantially larger area for the computer operator to write notes on, but it also makes it unnecessary to write anything on any label on the diskette (it is easy and quite practical to write the identification code on the sticker before attaching it to the diskette) therefore eliminated the possibility of damaging the diskette while writing on the label.

The following description of the preferred embodiment of the invention uses the word "pocket" to describe the filing enclosure. However, the invention is not limited to pocket-type enclosures but covers the use of any type of filing enclosures within the enclosed claims. The phrase "bottom of the pocket" is used to describe the section of the diskette filing enclosure which is opposite to the "opening of the pocket" where the diskette is principally inserted, regardless of the orientation of the pocket when it is placed inside a filing box.

The word "top", on the other hand, is used in the following text to specify the section of the filing enclosure which is topmost at any particular time when the enclosure/diskette combination is being stored in vertical or near vertical position in a storage box. Consequently, the top section of the filing enclosure is not necessarily opposite to the bottom of the enclosure as these sections are defined in this disclosure.

The broadest aspect of this invention relates to a filing system for computer diskettes comprising an identification label and a filing enclosure having an area printed with lines for writing information, said label including a pressure sensitive adhesive to permit attachment to a diskette and said filing enclosure made of a sheet material comprising a front panel and back panel each having a top portion, bottom portion and side portions, said bottom portion of said front and back panel connected by a transverse fold line to form a closed bottom, said top portion of said front and back panel secured together to form a closed top and at least one of said side portions of said front and back panel each including a cut-out forming an open end with an opposite side portion of said front and back panel secured together to form a closed side, whereby a filing enclosure is formed having a dimension between said closed top and bottom greater than a first dimension of the diskette with the distance between said closed side and said open end less than a second dimension of the diskette such that the diskette projects outwardly beyond the periphery of said filing enclosure to permit viewing of said label, said filing enclosure and said label including indicia means that are visually similar to readily indicate matching placement of a diskette to a filing enclosure.

Another aspect of this invention relates to a filing system for computer diskettes comprising an identification label and a filing enclosure having an area printed with lines for writing information, said label including a pressure sensitive adhesive to permit attachment to a diskette and said filing enclosure made of a sheet material comprising a front panel and back panel each having a first portion, second portion and spaced opposed third and fourth portions, said first portion of said front and back panel secured together to form a first closed portion said second portion of said front and back panel connected by a transverse fold line to form a second closed portion and at least one of said third or fourth portions of said front and back panel each including a cut-out forming an open end with said other one of said third or fourth portion of said front and back panel secured together to form another closed portion, whereby a filing enclosure is formed having a dimension between said closed first and second portions greater than a first dimension of the diskette with the distance between said another closed portion and said open end of said third and fourth portions being less than a second dimension of the diskette such that the diskette projects outwardly beyond the periphery of said filing enclosure to permit viewing of said label, said filing enclosure and said label including indicia means that are visually similar to readily indicate matching placement of a diskette to a filing enclosure.

Yet another aspect of this invention relates to a filing system for computer diskettes comprising an identification label and a filing enclosure having an area printed with lines for writing information, said label including a pressure sensitive adhesive to permit attachment to a diskette and said filing enclosure made of a sheet material comprising a front panel and back panel each having a first portion, second portion and spaced opposed third and fourth portions, said first portion of said front and back panel secured together to form a first closed portion, said second portion of said front and back panel secured together to form a second closed portion, and at least one of said third or fourth portions of said front and back panel each including a cut-out forming an open end with said other one of said third or fourth portion of said front and back panel secured together to form another closed portion, whereby a filing enclosure is formed having a dimension between said closed first and second portions greater than a first dimension of the diskette with the distance between said another closed portion and said open end of said third and fourth portions being less than a second dimension of the diskette such that the diskette projects outwardly beyond the periphery of said filing enclosure to permit viewing of said label, said filing enclosure and said label including indicia means that are visually similar to readily indicate matching placement of a diskette to a filing enclosure.

In one embodiment of the invention, one or both faces of the filing pocket is furnished with a special area (hereafter referred to as the "identification code field"), on which to write the identification code. In the preferred version of this embodiment, the location of the identification code field is selected in such a way that when the diskette is placed inside the pocket, the identification codes both on the diskette label and the pocket are close to each other so that it is easy to verify that the diskette is inside the right pocket. In a further embodiment of the invention, the identification code field on the pocket is located close to one of the top corners of the pocket, so that it stays at the top even when the pocket is stored in the upright position where it has been turned 90 degrees. Further, it is possible to preprint a frame on the identification code fields of both the sticker and the pocket so that both fields will appear visually substantially similar to each other.

In another embodiment of the invention, a special area is reserved for the notes of the user, facilitated by the presence of preprinted lines for this purpose on one or both faces of the pocket. As another enhancement of this embodiment, special fields can also be furnished for the title(s) of the diskette. It is preferable to place at least one of them close to the top section of the principal face of the pocket.

In another embodiment of the invention, the face of the pocket is made so high that it covers the major part of the top of the diskette, so that the top of the pocket is easily seen when several of them are stored simultaneously in the vertical position inside standard, commercially available storage boxes. In a further embodiment of the invention, the top of the pocket can be extended well above the top edge of the diskette to serve as an index tab. In a preferred version of this embodiment, the index tab section is manufactured as one long index tab, which can be cut by the user to create tabs of various smaller sizes and/or different locations along the top edge of the pocket.

It is also possible to preprint certain alphanumeric characters on special locations on the pocket, so that these alphanumeric fields can be used to identify the type of data stored on the diskette. It is also possible to color code the diskette/filing pocket combination by printing the identification label for the diskette and the principal sections of the pocket in the same distinctive color.

In the preferred embodiment of the invention the bottom section of the filing enclosure is constructed in such a way that the diskette cannot reach the extreme outer edge of the bottom section of the filing enclosure when inserted inside the enclosure. This restricted section of the filing enclosure can hereby serve as a fingergrip area to allow the user of the enclosure to get a good hold on the enclosure without grabbing the diskette when the said diskette is being pulled out from the enclosure.

The invention, as exemplified by preferred embodiments, is described with reference to drawings in which.

BRIEF DESCRIPTION OF THE DRAWINGS

DETAILED DESCRIPTION OF THE PREFERRED EMBODIMENTS

Referring to the drawings, the preferred embodiment of the invention shown, comprises an identification label 20 (attached onto the diskette 22) and a filing pocket or enclosure 24. On the face of the pocket, there is a special area reserved for the identification code field 26. The location of this field is preferably selected so that it is close to the identification label on the diskette, when the latter is placed inside the pocket. In the shown embodiment, the location of the identification code field is simultaneously also selected so, that it stays at the top of the pocket, even when the pocket is turned 90 degrees (counter-clockwise) from the position shown in FIG. 1 (clockwise from the position in FIG. 3). This turning of the pocket (and the diskette) may occasionally be preferred by the user if he/she wants to simultaneously see both the identification sticker and a standard diskette label, which may have been placed previously on the diskette. This requirement is likely to occur when old diskettes originally filed according to the old presently known methods are subsequently stored under the new method described in this disclosure.

Figure 3:
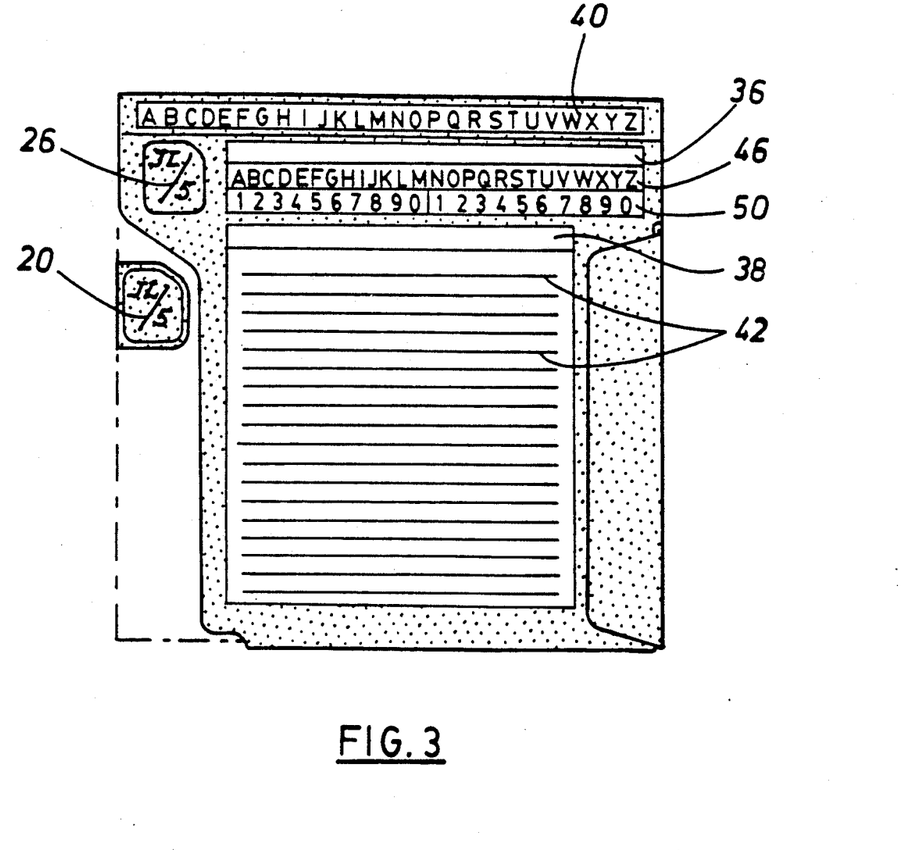
FIG. 3 is a direct rear view of the same arrangement as in FIG. 1 as it would appear after the identification code fields have been filled in by the user.

In FIG. 3 both identification fields (20 and 26) are shown as they could appear after the user has filled in an identification code, which may or may not have any connection to the other codes on the pocket used for filing purposes.

Figure 1:
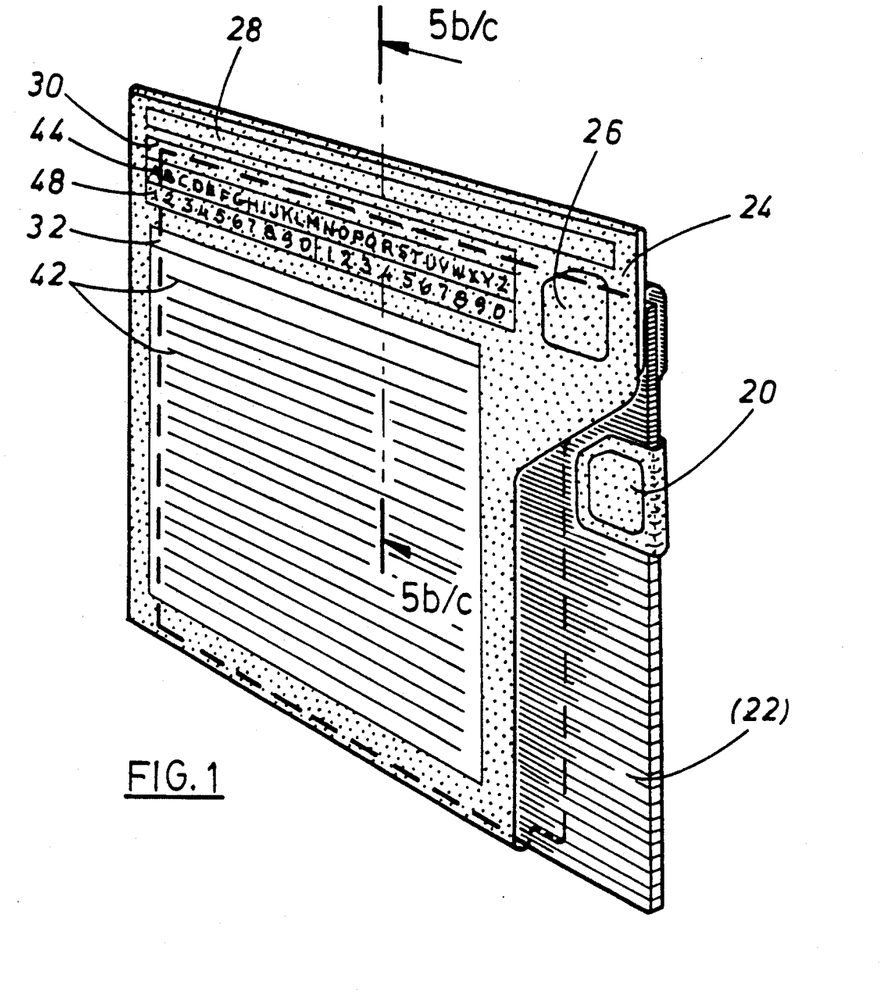
FIG. 1 is a perspective view of a principal face of the filing pocket with the diskette inserted, the latter being shown with the identification label attached.
Figure 2:
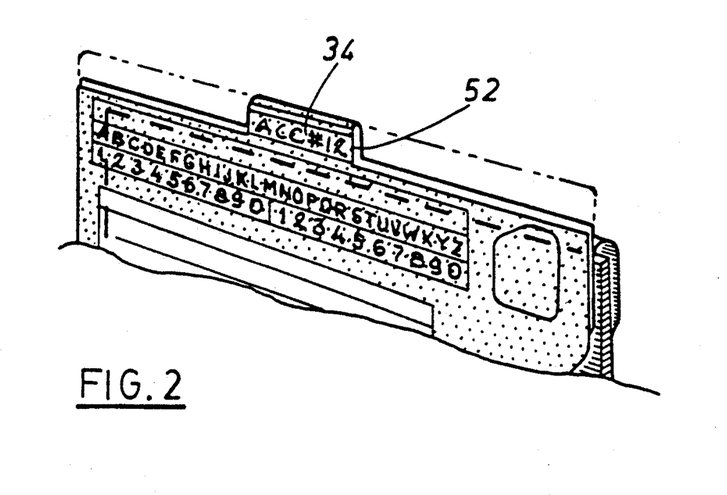
FIG. 2 is a partial view of the top of the filing pocket showing as an example how it may appear after the index tab section has been cut and filled in by the user.

On the top of the front side of the pocket shown in FIGS. 1 and 2, there are three printed framed areas 28, 30 and 32 to provide space for diskette titles. Alternatively, the topmost frame 28 can be used for writing information 34, which can be used for indexing purposes as described later.

At the back side of the filing pocket, only two of the printed framed areas 36 and 38 are left blank for the user, the topmost field 40 being permanently printed with alphanumeric characters for tab indexing purposes as will be described later.

A large portion of the surface area of the enclosure is reserved for notes, which can be written by the user on the lines 42 provided on either face of the pocket. These notes written by the user can include, but are by no means limited to the following type of information: Formatting Type and Date, Listing of the Data (files) on the Diskette, Booting and Other Information on the Programs stored on the Diskette, Detailed Information on Text and/on Graphics Files on the Diskette, e.g. Names of the Author, Data Processor and/or Customer, Names of the Departments of the Company the data is related to, Dates, etc.

In addition to general purpose Note Areas (lines 42) shown in FIGS. 1 and 3, it is also possible to print customized Note Areas, where special fields are printed and reserved for a particular type of reference. The present preferred embodiment of the invention shown in FIGS. 1 and 3 has altogether seven special reference areas. Two of these (44 and 46) have preprinted alphabets, for the user to circle and/or underline or otherwise highlight in order to show a letter code, which can be used to refer to a name of person, department, organization, month or a day of the week, or similar. The second set of these special fields (48 and 50) is of a similar type than the alphabetical fields but have preprinted numbers instead of letters. These numbers can again be highlighted as a numerical code, refering for example to Dates, Departmental Code Numbers, etc.

Figure 5A:
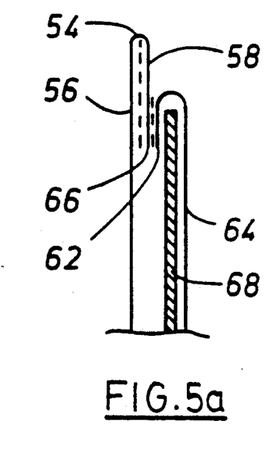
FIGS. 5a to 5g are sectional views of the top of the pocket showing different preferred embodiments for the construction of the cut-away index tab. Sectional views given in FIGS. 5b and 5c correspond to the exact configuration shown in FIG. 1 as taken along Section Line 5b/c—5b/c.
Figure 5B:
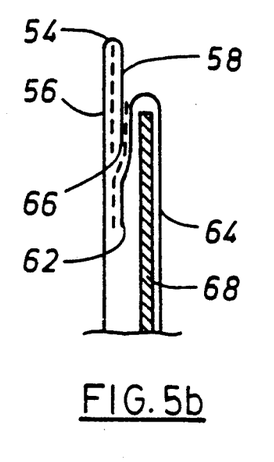
Figure 5C:
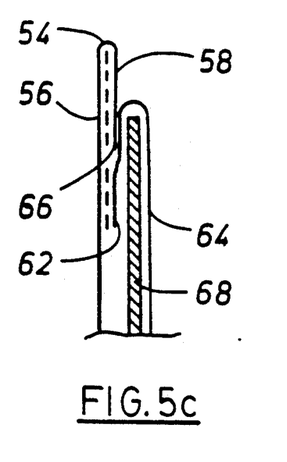
Figures 5D, 5E:
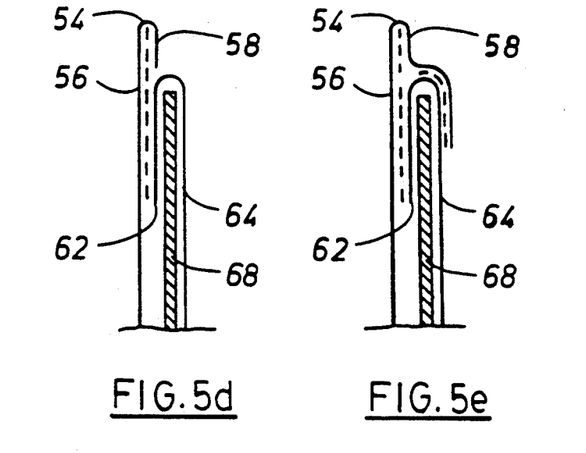
Figure 5F:
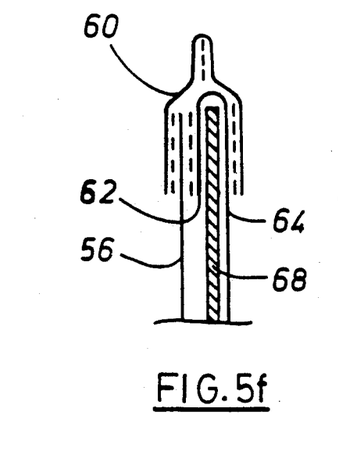
Figure 5G:
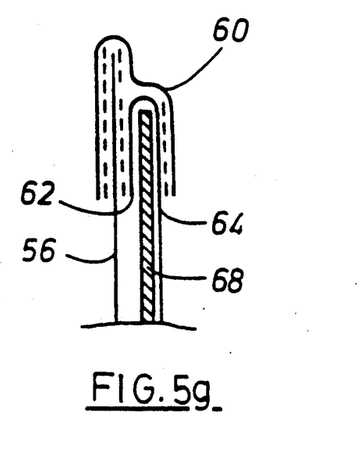

In the preferred embodiment of the invention, the topmost part of the pocket is constructed in such a way, that a section or sections of it can be cut or torn away, resulting in only a narrow section 52 being left to serve as an index tab as shown in FIG. 2. Several practical embodiments for an economical and strong construction of the index tab are shown in FIGS. 5a to 5g. As shown in FIGS. 5a to 5e the tab 54 itself consists of a (front face) pocket material 56, whose top section 58 is folded over and glued to the rest of the front sheet 56. Not only does this construction result in a strong tab, but is also quite economical due to the fact that thinner pocket material can be used and there is no need for double sided printing. It is also possible to have a basically similar tab construction by using a separate piece of material 60, which is folded over the top of the pocket and glued to the rest of the pocket as shown in FIGS. 5f and 5g. All gluelines in these cross-sectional drawings are shown as heavy, short dotted lines.

In the preferred embodiment of the invention the pocket itself (i.e. the section to hold the diskette) is constructed by folding the top section 62 of the back face 64 downwards, and glueing it to the lower section 66 of the fold over index tab 54 (FIGS. 5a to 5c) and/or to the back side of the top of the front sheet 56 (FIGS. 5b to 5g). This design has the advantage, that moving the diskette (68) in and out of the pocket produces only a minor separation force on the glue seam, which is holding the back sheet 64 and the front sheet 56 together. The preprinted alphanumeric characters (40 in FIG. 3) at the back side of the pocket can either serve as final index codes—in this case the pocket would be stored "back to front" in the storage box—or they may be used as a guide to cut out proper sections of the index tab area, whenever the front side of the tab is being used to write on any index codings as shown in FIG. 2. In this latter case the tab is to be cut as required by the length of the index text and its preferred location.

Figure 6:
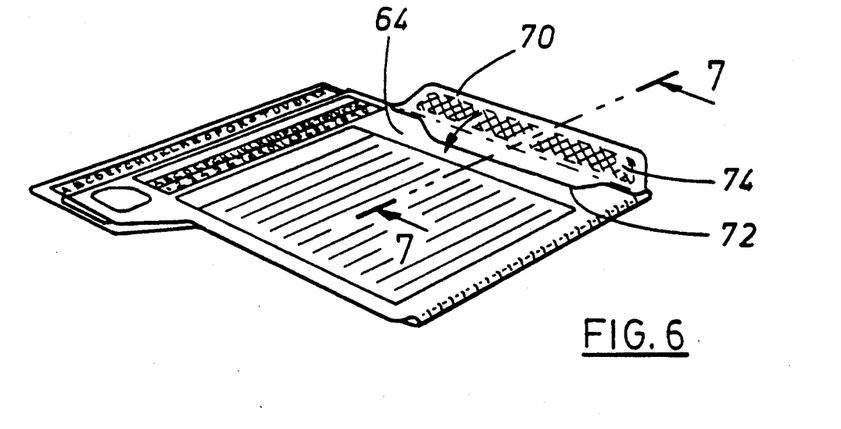
FIGS. 6 and 7 show the first of two different preferred embodiments for the construction of the so-called finger grip section of the filing pocket, one (FIG. 6) in perspective, the other (FIG. 7) in sectional view taken along Section Line 7—7 of FIG. 6.
Figure 7:
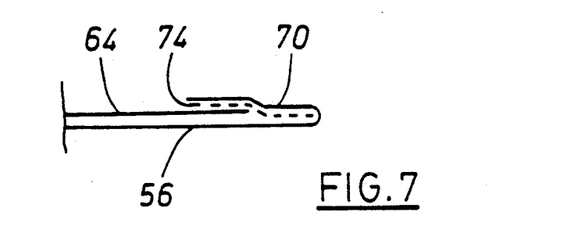
Figure 8:
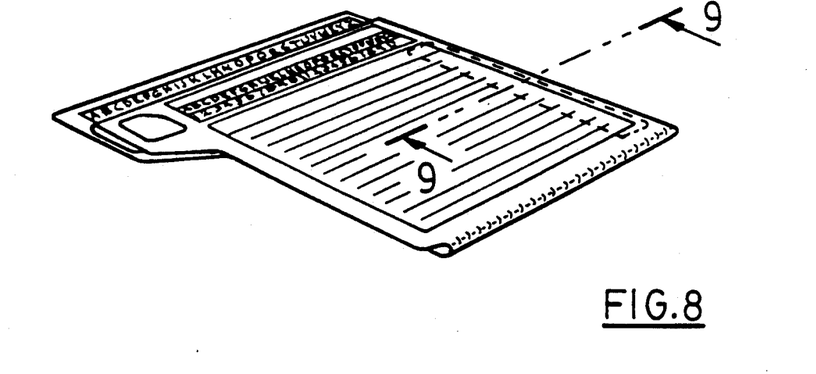
FIGS. 8 and 9 show the second preferred embodiment for the construction of the finger grip section.
Figure 9:
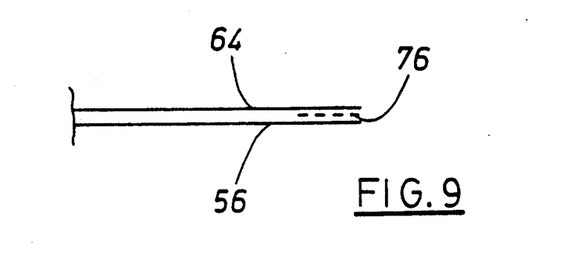

In FIGS. 6 to 9, it is shown how the bottom section can be constructed to serve as a finger-grip area for pulling the diskettes out of the pocket. In one of the two preferred embodiments of the invention as shown in FIGS. 6 and 7, the bottom section is comprised of a flap 70, which is a part of the front sheet 56, and which flap (70) is folded and attached to the face of the back side 64 of the pocket. The back face 64 is at least partially cut as shown by line 72, so that the adhesive 74 applied on the flap 70 (or alternatively on the back side of the pocket) attaches the flap both onto the back sheet 64, as well as to the back side of the front sheet 56. A similar effect can also be achieved with the construction shown in FIGS. 8 to 9. In this embodiment of the invention the front sheet 56 and back sheet 64 of the pocket are simply glued together with the adhesive layer 76 which is placed between them. Although basically a simple construction, this latter embodiment cannot be used with the glues which retain their stickiness long after the production of the pocket (such as pressure sensitive adhesives or water soluble glues under damp conditions). This is especially the case if the application of the glue causes the adhesive to splash creating a glue line which is not perfectly straight, therefore allowing the diskette, which is inserted inside the pocket, to become in touch with the glue and resulting the diskette getting glued to the pocket.

It should be understood that the pocket can also be manufactured as a mirror image of the embodiment described above, i.e. any reference to front face could be made to refer to the back side of the pocket and vice versa.

Figure 10:
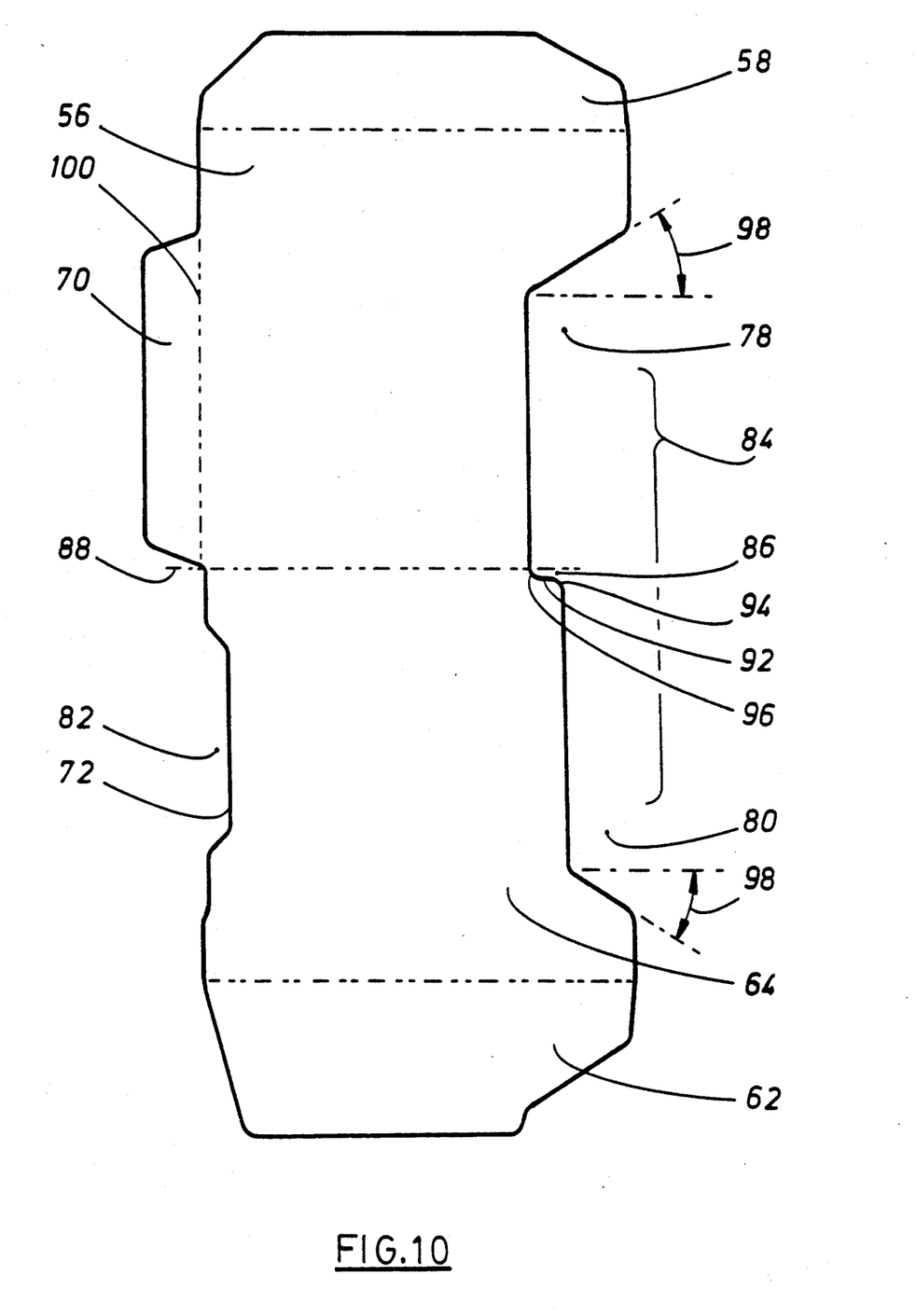
FIG. 10 shows a die cutting pattern, which will result in the folded and glued pocket, as shown in FIGS. 1 and 3.

In FIG. 10, a die cutting pattern is shown, which, after proper folding and glueing, will result in the filing pocket described above. One would especially like to point the following important sections of the cutting pattern:

Cut-outs 78 and 80 on the "open entry side" of the pocket;

Cut-out 82 on the bottom section of the pocket (i.e. the section opposite to the "open entry side").

Cut-out 78 on the right side edge of the front sheet 56 of the pocket is to make the identification sticker on the diskette visible to the user even when the diskette is completely inserted into the pocket. The other cut-out 80 serves for a similar purpose at the back of the pocket after folding. The area 84 between these two cut-outs allows the user to grab the diskette from the middle of its edge and insert the diskette into a disk drive of the computer without a need to change the hold.

In order to make it easy to insert the diskette back into the pocket, these above-mentioned "open entry side" cut-outs (78 and 80) are further shaped to include the following special features:

The cut-out 78 in the front sheet is made deeper than the one (80) at the back so that when the diskette is being inserted into the enclosure, the back sheet 64 of the pocket can be pushed backwards with the corner of the diskette in this way opening the mouth of the pocket;

The full length of the front cut-out 78 is extended over into the bottom end section 86 of the cut-out 80 at the back, so that the lower corner/edge of the diskette is free to enter into the pocket. In its preferred embodiment, this transition zone 86 from the front cut-out 78 to the cut-out 80 at the back is placed as close to the fold 88 between the front and back face of the pocket as the manufacturing tolerances will allow and the transition edge 92 is substantially parallel with the fold 88 with only relatively small rounding radii 94 and 96 to prevent the back fold of a standard diskette to become tangled with the edges (92 and 94) of the transition zone, when the diskette is being placed inside the pocket;

The top edges (after folding) of these major cut-outs (78 and 80) are made in such a way, that they form an angle 98 with the horizontal line removing the possibility of the diskette becoming tangled with the otherwise nearly square corners of the cut-outs when inserted into the pocket.

Cut-out 82 at the "bottom section" of the pocket results in the flap 70 becoming partially glued to the front sheet 56 of the pocket at the same time as it is also being glued to the back sheet 64 after being folded over along the fold line 100 as described previously in more detail in reference to FIGS. 6 and 7.

Figure 4:
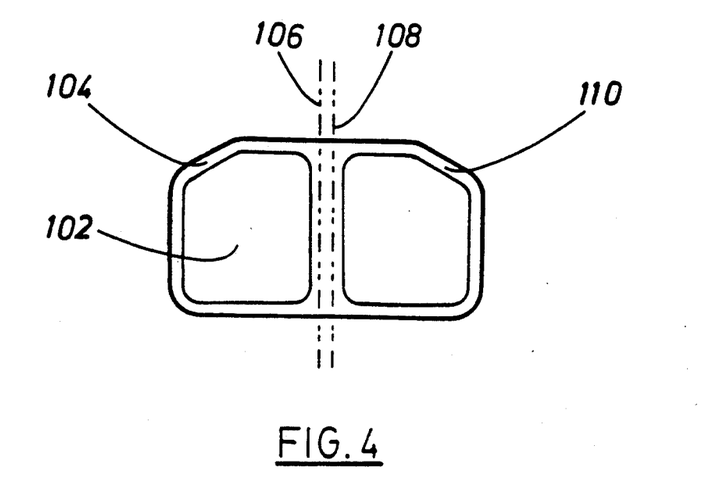
FIG. 4 is a picture showing a preferred embodiment of the identification label before it is attached to the diskette.

The construction of a preferred embodiment of the identification label 102 is shown in FIG. 4. The slanted top corners 104 and 110 of the label make it possible that the label can be placed on the diskette in a position, which is close to the identification fields on the filling pocket. When attaching the label to the diskette the front section of the label (the left-hand section in FIG. 4) is normally first fixed to the front of the diskette and the label is then further folded along ("imaginary") fold lines 106 and 108 so that it will wrap around the edge of the diskette and the back section (the right-hand section in FIG. 4) of the label will be attached to the back side of the diskette.

The above-mentioned "wrap-around-the-edge" design has the advantage that not only is the label visible on both sides of the diskette but the edge of the label can been seen by the operator even when the diskette is placed inside the disk drive of the computer. Consequently, when the color coding of the labels is being used, it is possible to recognize what kind of diskette is inside the drive without pulling the diskette out.

A preferred way of printing the color coding on the filing pocket and the identification label is demonstrated in FIGS. 1 to 3 by showing the suggested color-coded areas covered by dotted hatching. In the embodiments shown, the color coding patterns on the front and the back of the filing pocket are designed to be slightly different so that it will be easier for the user to recognize immediately which side of the pocket is facing him. It is obvious that the detail patterns of the color coded areas can vary from one application to the other as long as their use is within the accompanying claims.

No reference has been made to the actual size of the filing enclosure due to the fact that there are several standard sizes of computer diskettes all substantially similar in shape but varying in size. The filing method according to present invention can be used to accommodate all known computer diskettes either by making separate filing pockets and/or identification labels for each diskette size or by storing smaller diskettes in oversized enclosures as long as they fall within the enclosed claims.

Although only a single embodiment of the present invention with slight variations has been described and illustrated, the invention is not limited to the detail features of this particular embodiment, but includes all variations and modifications within the scope of the claims.

The embodiments of the invention in which an exclusive property or privilege is claimed are defined as follows:

1. A filing system for computer diskettes comprising an identification label and a filing enclosure having an area printed with lines for writing information, said label including a pressure sensitive adhesive to permit attachment to a diskette and said filing enclosure made of a sheet material comprising a front panel and back panel each having a top portion, bottom portion and side portions, said bottom portion of said front and back panel connected by a transverse fold line to form a closed bottom, said top portion of said front and back panel secured together to form a closed top and at least one of said side portions of said front and back panel each including a cut-out forming an open end with an opposite side portion of said front and back panel secured together to form a closed side, whereby a filing enclosure is formed having a dimension between said closed top and bottom greater than a first dimension of the diskette with the distance between said closed side and said open end less than a second dimension of the diskette such that the diskette projects outwardly beyond the periphery of said filing enclosure to permit viewing of said label, said filing enclosure and said label including indicia means that are visually similar to readily indicate matching placement of a diskette to a filing enclosure.

2. A filing system according to claim 1 wherein said indicia means comprises identification codes of numeric or alphabetic symbols or combinations thereof.

3. A filing system according to claim 1 wherein said indicia means comprises matching colours which identify them as corresponding together.

4. A filing system according to claim 1 wherein said top portion of said front panel includes a top flap connected by a first fold line parallel to said transverse fold line and said top portion of said back panel includes a back panel flap connected by a second fold line parallel to said transverse fold line.

5. A filing enclosure according to claim 4 wherein the distance between said first fold line and a parallel end edge of said top flap is less than the distance between said second fold line and a corresponding parallel end edge of said back panel flap.

6. A filing system according to claim 4 wherein said closed top is formed by folding said top flap parallel to said first fold line into overlapping relationship to said front panel and said back panel flap is folded parallel to said second fold line.

7. A filing system according to claim 6 wherein said top flap is adhesively secured to said back panel flap.

8. A filing system according to claim 6 wherein said back panel flap is adhesively secured to said back panel.

9. A filing system according to claim 4 wherein said back panel flap is adhesively secured to said front panel.

10. A filing system according to claims 1 or 4 wherein said closed side includes a front panel side flap connected to said front panel by a fold line and adhesively secured to said back panel.

11. A filing system according to claim 1 wherein said closed top comprises an extension of least 3/16 of an inch beyond the first dimension of the diskette.

12. A filing system according to claims 1 or 11 wherein said closed top includes a tab formed by removal of portions of said closed top.

13. A filing system according to claim 12 wherein said tab includes indicia means.

14. A filing system for computer diskettes comprising an identification label and a filing enclosure having an area printed with lines for writing information, said label including a pressure sensitive adhesive to permit attachment to a diskette and said filing enclosure made of a sheet material comprising a front panel and back panel each having a first portion, second portion and spaced opposed third and fourth portions, said first portion of said front and back panel secured together to form a first closed portion, said second portion of said front and back panel connected by a transverse fold line to form a second closed portion and at least one of said third or fourth portions of said front and back panel each including a cut-out forming an open end with said other one of said third or fourth portion of said front and back panel secured together to form another closed portion, whereby a filing enclosure is formed having a dimension between said closed first and second portions greater than a first dimension of the diskette with the distance between said another closed portion and said open end of said third and fourth portions being less than a second dimension of the diskette such that the diskette projects outwardly beyond the periphery of said filing enclosure to permit viewing of said label, said filing enclosure and said label including indicia means that are visually similar to readily indicate matching placement of a diskette to a filing enclosure.

15. A filing system as claimed in claim 14 wherein said first portion comprises a top portion, said second portion comprises a bottom portion, and said third and fourth portions comprise side portions.

16. A filing system for computer diskettes comprising an identification label and a filing enclosure having an area printed with lines for writing information, said label including a pressure sensitive adhesive to permit attachment to a diskette and said filing enclosure made of a sheet material comprising a front panel and back panel each having a first portion, second portion and spaced opposed third and fourth portions, said first portion of said front and back panel secured together to form a first closed portion, said second portion of said front and back panel secured together to form a second closed portion, and at least one of said third or fourth portions of said front and back panel each including a cut-out forming an open end with said other one of said third or fourth portion of said front and back panel secured together to form another closed portion, whereby a filing enclosure is formed having a dimension between said closed first and second portions greater than a first dimension of the diskette with the distance between said another closed portion and said open end of said third and fourth portions being less than a second dimension of the diskette such that the diskette projects outwardly beyond the periphery of said filing enclosure to permit viewing of said label, said filing enclosure and said label including indicia means that are visually similar to readily indicate matching placement of a diskette to a filing enclosure.

17. A filing system as claimed in claim 16 wherein one of said front and back panels secured together to form another closed portion presents a finger grip area for gripping so as to assist when pulling said computer diskette out of said enclosure.

18. A filing system as claimed in claim 17 wherein said finger grip area is comprised of said one of said third or fourth portions of said front and back panels is glued together to form said another closed portion.

19. A filing system as claimed in claim 18 wherein said finger grip area is comprised of said one of said third or fourth portions of said front and back panels is folded over said other one of said panels and glued together to form said another closed portion.

* * * * *